US007686445B2

(12) United States Patent
Fioravanti et al.

(10) Patent No.: US 7,686,445 B2
(45) Date of Patent: Mar. 30, 2010

(54) METHOD FOR MONITORING A TRANSFER SURFACE MAINTENANCE SYSTEM

(75) Inventors: Alexander J. Fioravanti, Penfield, NY (US); Howard Mizes, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 603 days.

(21) Appl. No.: 11/184,391

(22) Filed: Jul. 19, 2005

(65) Prior Publication Data

US 2007/0019052 A1 Jan. 25, 2007

(51) Int. Cl.
*B41J 29/393* (2006.01)
*B41J 2/01* (2006.01)
*B01D 11/00* (2006.01)

(52) U.S. Cl. .......................... 347/103; 347/19; 347/37; 347/86; 347/88; 347/140; 435/6; 600/315; 600/407

(58) Field of Classification Search .................. 347/103
See application file for complete search history.

(56) References Cited

U.S. PATENT DOCUMENTS 4,536,082 A * 8/1985 Motohashi et al. ............ 399/51
4,636,803 A 1/1987 Mikalsen
4,673,303 A * 6/1987 Sansone et al. ............. 347/103
4,739,339 A 4/1988 DeYoung et al.
5,038,157 A 8/1991 Howard
5,124,732 A * 6/1992 Manzer et al. .............. 347/140
5,372,852 A 12/1994 Titterington et al.
5,453,777 A * 9/1995 Pensavecchia et al. ...... 347/234
5,808,645 A * 9/1998 Reeves et al. ............... 347/103
5,966,157 A * 10/1999 Dolan ........................ 347/103
6,019,044 A * 2/2000 Bertrand ..................... 101/425
6,053,608 A 4/2000 Ishii et al.
D453,787 S 2/2002 Mattern
6,386,697 B1 * 5/2002 Yamamoto et al. .......... 347/103
6,412,902 B2 * 7/2002 Matsumoto et al. ........... 347/19
6,905,186 B2 * 6/2005 Kojima ........................ 347/19
2004/0114009 A1 * 6/2004 Pan et al. ...................... 347/88
2004/0114018 A1 * 6/2004 Pan et al. .................... 347/103
2005/0134874 A1 * 6/2005 Overall et al. ................ 358/1.9

* cited by examiner

*Primary Examiner*—Matthew Luu
*Assistant Examiner*—John P Zimmermann
(74) *Attorney, Agent, or Firm*—Fay Sharpe LLP

(57) ABSTRACT

A method and system for monitoring a print drum maintenance system of an image producing machine is disclosed herein in various embodiments. A test pattern is printed on the print drum, and imaged with an image-on-drum detector to determine a printed pattern response. The print drum is then cleaned again imaged with the image-on-drum detector to determine a cleaned print drum response. A cleaning efficiency is computed by comparing the imaged test pattern response to the imaged cleaned print drum response and determining if a failure condition exists by comparing the computed cleaning efficiency to predetermined limits. A corrective process is performed if the failure condition does exist, the corrective process including changing parameters of the drum maintenance system according to the computed cleaning efficiency. The changed parameters are compared to predetermined thresholds and, if not exceeding the thresholds, the cleaning is repeated after the parameters are changed.

13 Claims, 5 Drawing Sheets

METHOD FOR MONITORING A TRANSFER SURFACE MAINTENANCE SYSTEM

BACKGROUND

This disclosure relates, in various embodiments, generally to image producing machines, and more particularly to a solid ink imaging machine having an intermediate transfer surface and an intermediate transfer surface maintenance system.

In general, phase change ink image producing machines or printers employ phase change inks that are in the solid phase at ambient temperature, but exist in the molten or melted liquid phase (and can be ejected as drops or jets) at the elevated operating temperature of the machine or printer. At such an elevated operating temperature, droplets or jets of the molten or liquid phase change ink are ejected from a print head device of the printer onto a print drum or belt that can then be transferred directly onto a final image receiving substrate. In any case, when the ink droplets contact the surface of the substrate, they quickly solidify to create an image in the form of a predetermined pattern of solidified ink drops.

An example of such a phase change ink image producing machine or printer, and the process for producing images therewith onto image receiving sheets is disclosed in U.S. Pat. No. 5,372,852 issued Dec. 13, 1994 to Titterington et al. As disclosed therein, the phase change ink printing process includes raising the temperature of a solid form of the phase change ink to melt it and form a liquid phase change ink. It also includes applying droplets of the phase change ink in a liquid form to an intermediate transfer surface on a solid support in a pattern using a device such as an ink jet print head. It then includes solidifying the phase change ink on the intermediate transfer surface, transferring the phase change ink from the intermediate transfer surface to the substrate, and fixing the phase change ink to the substrate.

Conventionally, the solid form of the phase change is a "stick", "block", "bar" or "pellet" as disclosed for example in U.S. Pat. No. 4,636,803 (rectangular block 24, cylindrical block 224); U.S. Pat. No. 4,739,339 (cylindrical block 22); U.S. Pat. No. 5,038,157 (hexagonal bar 12); U.S. Pat. No. 6,053,608 (tapered lock with a stepped configuration). Further examples of such solid forms are also disclosed in design patents such as U.S. Pat. No. D453,787 issued Feb. 19, 2002. In use, each such block form "stick", "block", "bar" or "pellet" is fed into a heated melting device that melts or phase changes the "stick", "block", "bar" or "pellet" directly into a print head reservoir for printing as described above.

The quality of the images produced by phase change ink image producing machines or printers depends in part on how well the print drum or belt is maintained by a drum maintenance system, i.e., how well any residues are cleaned from the print drum and how evenly a release oil is applied to the print drum. Such quality also depends on the print drum and its surface finish or texture, the print heads, and the image receiving substrates. Many such image producing machines have adjustable parameters which can improve the cleaning effectiveness of the drum maintenance system. However, setting or adjusting of these parameters is performed either on a scheduled basis, or only after the quality of the printed images is observed to be deteriorating.

There is therefore a need for a system and method for automatically monitoring the performance of the drum maintenance system and adjusting parameters of the drum maintenance system to maintain the quality of the printed images automatically.

BRIEF DESCRIPTION

A method and system for monitoring a transfer surface maintenance system of an image producing machine is disclosed herein. The method and system includes printing a test pattern on the transfer surface, imaging the printed test pattern with a transfer surface image detector to determine a printed pattern response. The transfer surface is then cleaned by utilizing the transfer surface maintenance system, and the cleaned transfer surface is again imaged with the transfer surface image detector to determine a cleaned image response. A cleaning efficiency is computed by comparing the imaged test pattern response to the cleaned image response and determining if a failure condition exists by comparing the computed cleaning efficiency to predetermined limits. A corrective process is performed if the failure condition does exist, the corrective process including changing parameters of the transfer surface maintenance system according to the computed cleaning efficiency. The changed parameters are compared to predetermined thresholds and, if not exceeding the thresholds, the cleaning is repeated after the parameters are changed. A failure status is indicated, however, if the predetermined thresholds are exceeded. Normal printing is continued when no failure condition exists.

In another embodiment, is a print drum maintenance monitoring system comprising a print head system; a print drum for receiving one or more inks from the print head system, which form an image pattern on the print drum, and for transferring the received image pattern to a substrate; an image-on-drum detector configured to detect images on the print drum; a drum maintenance system configured to clean ink from the print drum; and, a control system for controlling the print drum maintenance system and the image-on-drum monitoring detector, the control system including a random access memory and programming configured to periodically: print a test pattern on the print drum; image the printed test pattern with the image-on-drum detector to determine a test pattern image response, storing the test pattern image response in the memory; clean the print drum by utilizing the drum maintenance system; image the cleaned print drum with the image-on-drum detector to determine a cleaned print drum response, storing the cleaned print drum response in the memory; compute a cleaning efficiency by comparing the stored test pattern response to the stored cleaned print drum response; determine if a failure condition exists by comparing the computed cleaning efficiency to predetermined limits; perform a corrective process if the failure condition does exist as a result of the determining, the corrective process including: changing parameters of the drum maintenance system according to the computed cleaning efficiency; comparing the changed parameters to predetermined thresholds; repeating the cleaning, computing, determining if the predetermined thresholds are not exceeded based on the comparing; and, indicating a failure status if the predetermined thresholds are exceeded based on the comparing; and, continue normal printing if the failure condition does not exist as a result of the determining.

These and other non-limiting characteristics of the development are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
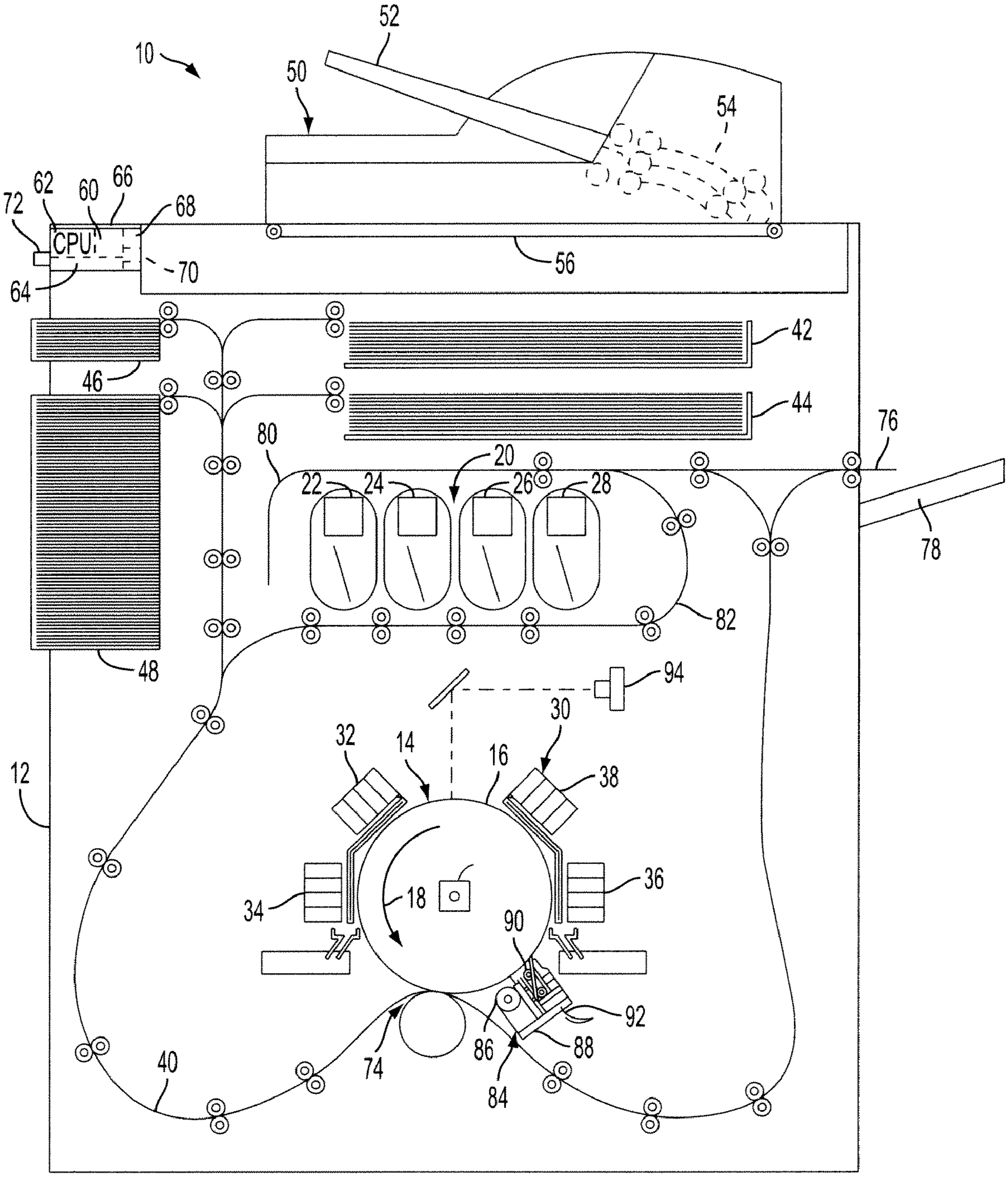
FIG. 1 is a schematic representation of an image producing machine including an embodiment of the present disclosure.

A more complete understanding of the components, processes and apparatuses disclosed herein can be obtained by reference to the accompanying drawings. These figures are merely schematic representations based on convenience and the ease of demonstrating the present development, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular texture of the embodiments selected for illustration in the drawings, and are not intended to define or limit the scope of the disclosure. In the drawings and the following description below, it is to be understood that like numeric designations refer to components of like function.

With reference to FIG. 1 there is illustrated an exemplary image producing machine suitable for incorporating embodiments of the present disclosure. The particular machine shown is a high-speed phase change ink image producing machine or solid ink printer 10. As shown, the printer 10 includes a housing 12 in which, or on which, are mounted directly or indirectly all its operating subsystems and components as described in more detail in the following disclosure. The printer 10 includes a printer drum 14 on which phase change ink images are formed for subsequent transfer to a substrate such as, e.g., paper. Although the embodiments disclosed herein are described with reference to an imaging member comprising an imaging drum, the printer drum 10, the concepts of the present disclosure but can be implemented on machines utilizing an endless belt as an imaging member. The print drum 14 has an imaging surface 16 that is movable in the direction 18 in this particular embodiment, and on which phase change ink images are formed.

The printer 10 includes a phase change ink delivery subsystem 20 that includes at least one source 22 of a color phase change ink in solid form. Since the particular printer 10 described herein is a multicolor image producing machine, the ink delivery system 20 includes four sources 22, 24, 26, 28, representing four different colors of phase change inks such as, e.g., cyan, yellow, magenta, and black (CYMK). The phase change ink delivery system also includes a melting and control apparatus (not shown) for melting, phase changing, the solid form of the phase change ink into a liquid form, and for then supplying the liquid form to a print head system 30 including at least one print head assembly 32. Since the printer 10 is a high-speed, multicolor image producing machine, the print head system 30 includes four separate print head assemblies 32, 34, 36 and 38 as shown, however, the present disclosure is applicable to imaging systems having any number of print head assemblies, or imaging systems having only one print head assembly.

A substrate supply and handling system 40 is provided, including substrate supply sources 42, 44, 46, 48 for storing and supplying image receiving substrates in various selectable forms such as, e.g., cut sheets. The substrate supply and handling system 40 does not necessarily include multiple supply sources as the printer 10 is provided for exemplary purposes only. The printer 10 as shown may optionally include an original document feeder 50, including a document holding tray 52, document sheet feeding and retrieval system 54, and a document exposure and scanning system 56.

Operation and control of the various subsystems, components and functions of the machine or printer 10 are performed with the aid of a controller 60. The controller 60 includes a central processor unit (CPU) 62, electronic storage or memory 64, and a user interface 66. The controller 60 includes a sensor input and control means 68 and a pixel placement and control means 70. Normally, the CPU 62 reads, captures, prepares and manages the image data flow between image input sources such as the scanning system 56, a network connection 72, and the print head system 30. The controller 60 controls operation of the remaining subsystems and functions, including the printing operations.

In operation, image data for an image to be produced is sent to the controller 60 from either the scanning system 56 or via the network connection 72 for processing and subsequent transmission to the print head system 30. Additionally, the controller 60 determines and/or accepts related subsystem and component signals, e.g., from operator inputs via the user interface 66, and accordingly acts upon such signals. As a result, selected colors of solid-form phase change ink are melted and delivered to the print head assemblies 32-38. Additionally, pixel placement control is exercised relative to the imaging surface 16, thereby forming desired images on the imaging surface 16. Further, substrates are supplied by any one of the sources 42, 44, 46, 48 and handled by the substrate supply and handling system 40 in timed registration with image formation on the imaging surface 16. The formed image is transferred within a transfer nip 74, from the imaging surface 16 onto the receiving substrate which then exits via exit path 76 where it is stacked on an output tray 78 if no further processing is required on the substrate. If, for example, the substrate requires a second processing for duplex printing operations, the substrate enters a reversing path 80 for a second processing via reentry path 82 before exiting via exit path 76.

Still referring now to FIG. 1, in order to maintain the quality of images produced by the printer 10, a drum maintenance system 84 is included. The drum maintenance system 84 includes an oiling roller 86 that is movable by an oiling roller engagement apparatus 88 into and out of oiling engagement with the imaging surface 16 of the imaging drum 14. The oiling roller 86 applies a selected amount of release oil to the imaging surface 16 in order to facilitate a complete transfer of formed images from the print drum 14 to the substrate passing through the transfer nip 74. The drum maintenance system 84 also includes a cleaning blade 90, or a plurality of cleaning blades, and a cleaning blade pressure apparatus 92 for providing the selected amount of pressure applied by the cleaning blade 90 to the imaging surface 16. The cleaning blade 90 is operated as necessary by the controller 60 for removing any ink residue, or other contaminants, from the imaging surface 16. In summary, the drum maintenance system's function includes maintaining the oil coverage on the drum so images transfer efficiently from the print drum to the substrate. If the transfer is incomplete, the drum maintenance system utilizes the cleaning blade to scrape any residual ink from the drum to prevent the residue from appearing on subsequent images.

High-throughput printers having multiple print head assemblies 32-38 such as the embodiment shown in the FIGURE require a tight constraint on their registration. In such systems, there are also high requirements regarding reliability of the print head, which requires periodic or constant monitoring of the condition of the jets in order to maintain a proper level of image quality. In embodiments described herein, the registration and print head monitoring are performed by printing test patterns on the print drum 14 at regular intervals, and then imaging the printed test patterns with an image-on-drum (IOD) detector 94 such as, e.g., a full width array (FWA) detector, and then cleaning the test patterns off of the print drum by means of the drum maintenance system 84. In some embodiments, the test pattern is used to monitor the health of nozzles on the print head assemblies 32-38 at the end of every job. The test pattern, to ensure complete testing of the print heads, contains, e.g., multiple repeats of short dashes using every nozzle on each of the print head assemblies, although other forms of test patterns may be used. Of course, the test pattern must be cleaned from the imaging surface 16 after being printed and detected so their temporary existence is not noticeable to the user. If test pattern is not completely cleaned from the imaging surface 16, parts of the test pattern may show on the next printed image.

The printer 10 may, as desired, include more than one IOD detector, and the present disclosure is not limited in that respect, nor is the present disclosure limited with respect to the type of IOD detector used in the printer 10. For example, for speed and accuracy, the embodiments described herein utilize a full-width-array (FWA) detector, however, other types of detectors such as scanning detectors may be utilized. One might assume that it is sufficient to measure the condition of the imaging surface 16 with the IOD detector 94 after a cleaning operation by the drum maintenance system 84 without first printing and detecting the printed test pattern. However, a problem arises because of a large amount of texture on the imaging surface 16 which makes it difficult to determine if the imaging surface 16 is clean as is described in more detail below.

Figure 2:
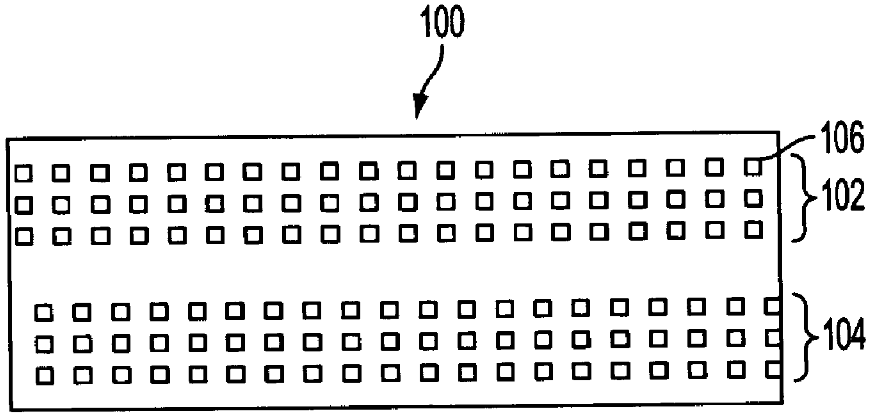
FIG. 2 is a section of an imaging surface of the machine of FIG. 1 including a printed test pattern.

In order to facilitate a full understanding of the embodiments described herein, an exemplary method of identifying a cleaning failure of the print drum 14 is first described. With reference to FIG. 2, in a first step to determine if a cleaning failure has occurred, a test pattern 100 comprising a series of short dashes is printed on the drum. The particular test pattern used contains two strips 102, 104, each strip comprising three rows of short dashes 106. The strips may be arranged as needed to suit a particular printer. For example, in this exemplary case, the first strip 102 utilizes the first and third rows of print head nozzles (not shown), and the second strip 104 utilizes the second and fourth rows of nozzles. Also, in the example shown, there are three rows of the dashes 106 in each strip in order to monitor a sufficiently large area of the print drum 14. If it is advantageous to monitor a larger area of the print drum, the number of rows (repeats) can be increased, and the same algorithms can be used to analyze the cleaning effectiveness of each row.

In some embodiments, the test pattern is printed at nominal rotational speed of the print drum 14, and the print drum is then slowed in order to detect the printed image with the IOD detector 94. After the test pattern is imaged and stored in memory 64, the imaging surface 16 of the print drum 14 is cleaned by the drum maintenance system 84. The same area of the drum is then imaged again with the IOD detector and stored in memory. By comparing the stored before and after images (printed pattern response and cleaned print drum response) and using image processing techniques, any dashes remaining can be identified.

Figure 3:
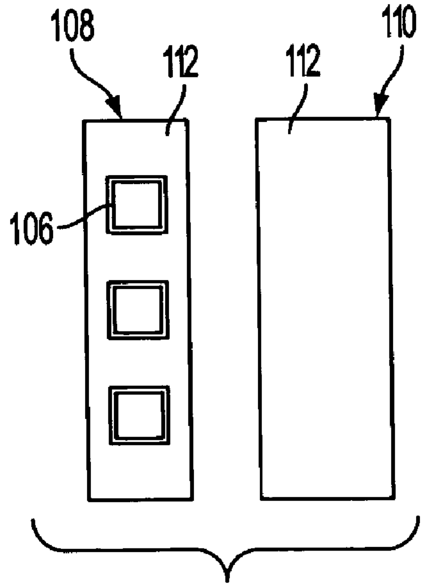
FIG. 3 is an enlarged section the imaging surface shown in FIG. 2 before and after a drum cleaning operation.

The first step in the comparison analysis is to identify the amplitude of all the dashes in the un-cleaned image by examining the printed pattern response. Amplitude, as used herein, refers to the difference in the response between the IOD detector 94 when imaging the cleaned drum and when imaging the center of the printed dash. This can be accomplished even if the imaging surface 16 has a large amount of texture (noise). For example, after the un-cleaned test pattern image response is analyzed, the position of all the dashes in a cross process direction. i.e., perpendicular to the path of the substrate, is known. The profile of the cleaned image response in the same positions is then analyzed to determine the IOD detector response at each dash position. FIG. 3 shows an example set of three short dashes 106 printed with the same print head nozzle for an un-cleaned image 108 and for a cleaned image 110. The noise texture 112 of the imaging surface 16 is evident in the images 108, 110 and it can be observed from the FIGURE that the noise 112 remains approximately constant in both images.

Figure 4:
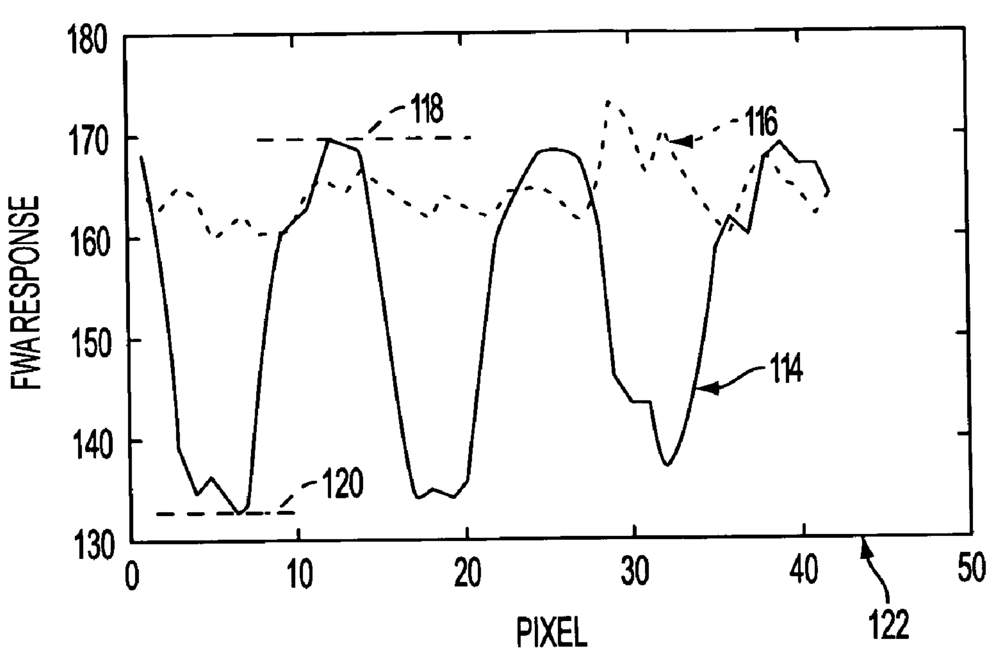
FIG. 4 is an image-on-drum detector response in a process direction.

FIG. 4 shows a cross section 114 in the process direction (substrate path direction) of the IOD detector response through the three dashes 106 shown in the previous FIGURE, averaged over the width of the dashes. Also shown is a baseline response 116 of a cleaned imaging surface 16 through the same process direction cross section. From the averaged cross section 114, the IOD detector scans that contain the image of each dash can be identified. This is done by identifying the indices of the IOD responses that are less than the midpoint between the maximum response and the minimum response. In this example, the maximum IOD response is approximately 170 (118) and the minimum IOD response is approximately 130 (120). Therefore, IOD detector responses less than 150 are assumed to be going through the corresponding dash. For the particular FWA detector used for the IOD detector 94, each pixel 122 in the process direction represents the response of one scan of the IOD detector 94. These scan responses show scans 2 through 9 to be for the topmost dash 106, 16 through 22 for the middle dash, and 29 through 34 for the bottommost dash 106.

Figure 5:
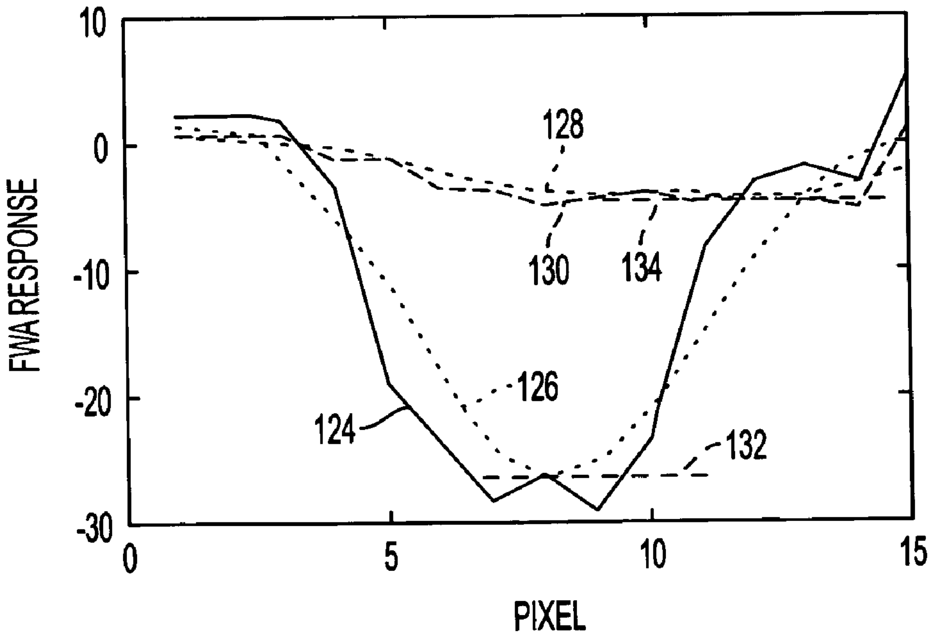
FIG. 5 is an image-on-drum detector response in a cross-process direction.

To obtain the response of each of the dashes 106, a cross section each of the IOD detector 94 scans in the cross-process direction is computed. FIG. 5 shows the sensed cross-process cross section 124 for scans 2 through 9 described above. The cross section contains noise due to the aforementioned texture of the imaging surface 16. The imaging surface noise limits the accuracy of using interpolation to determine the center of the dash. Therefore, in order to remove this noise from the response, a 6 point moving average filter is applied to each of the cross sections. The filter preferably also contains logic to remove any multiple images that can appear due to out of focus images. The filtered un-cleaned response 126 of the sensed dash is provided in the FIGURE, as are the filtered cleaned-drum response 128 and the raw cleaned-drum response 130 of the cleaned imaging surface 16.

The minimum 132 of the un-cleaned filtered response 126 is identified. The curvature of the filtered response around the minimum is determined by taking the quadratic coefficient to a quadratic fit of the minimum and the 4 nearest neighbor points on the filtered curve. The minimum 134 of the cleaned filtered response 128 is then obtained in like manner. If the cleaned filtered response minimum 134 is not within 2 pixels of the un-cleaned filtered response minimum 132, it is assumed that the test pattern dash was effectively cleaned from the imaging surface 16, the un-cleaned minimum 132 being an observation of the imaging surface noise texture. If, however, the two described minimums are within 2 pixels of each other, then it is assumed that the minimum occurs from remains of the appropriate test pattern dash 106. The disclosure is, however, not limited to a 2 pixel maximum disparity between the minimums and any appropriate disparity may be utilized.

A suitable metric for the strength of a remaining dash is the ratio of the above-described computed curvatures before and after cleaning. If the test pattern dash is not cleaned, then the images are similar, and the ratio approaches unity. If the test pattern dash is partially cleaned, then the profile of the cross section will have a smaller amplitude, and both the curvature and the minimum will be reduced similarly. If the test pattern dash is absent, and the texture of the drum is such that a minimum occurs in the vicinity of the test pattern dash center, the algorithm may indicate a partial dash remains when it does not, however, the value obtained is the noise of the measurement which can be accounted for in algorithms for determining the cleaning efficiency of the drum maintenance system.

Figure 6:
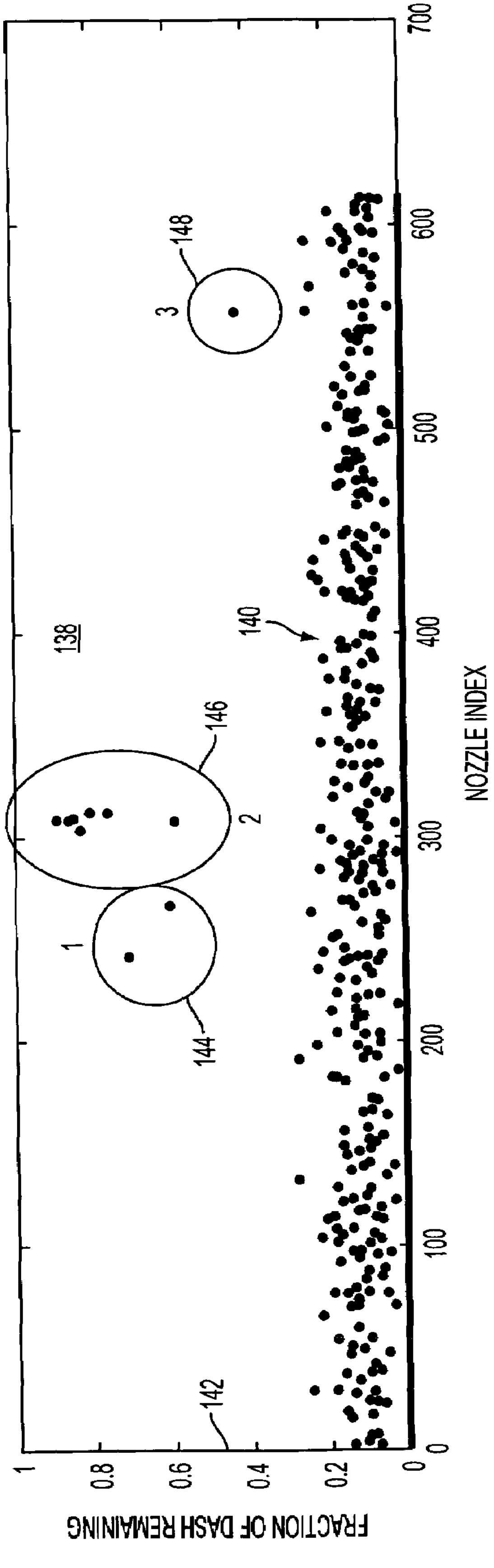
FIG. 6 is a sample cleaning effectiveness profile.

With reference now to FIG. 6, a sample cleaning effectiveness profile 138 is shown. Each of the dots 140 is representative of a particular nozzle of the print head, or a particular nozzle at a particular position in the case of translating print heads. The corresponding position on the y-axis 142 represents the magnitude of the above-described metric. A majority of the dots 140 lie on or near the x-axis. For these readings, the dash was effectively cleaned from the imaging surface 16 and the drum surface texture was such that there was no minimum IOD detector response in the vicinity of the dash center. Most of the remaining readings lie between metric magnitudes of 0 and 0.25. This is the level of noise in the measurement caused by the surface texture. For these readings, the surface has texture that just happens to cause a minimum in the IOD detected response to occur near the known dash center.

Three sets of dashes are circled in the FIGURE that exceed a reading of 0.4. These correspond to regions of the drum where the dashes potentially remain after cleaning. The first region 144 shows what may be two partially cleaned dashes. The second region 146 shows a larger set of dashes that almost completely remain. The third region 148 shows one large metric. These three regions having large-magnitude metrics indicate that portions of the imaging surface 16 are not being cleaned effectively by the drum maintenance system 84.

Figure 7:
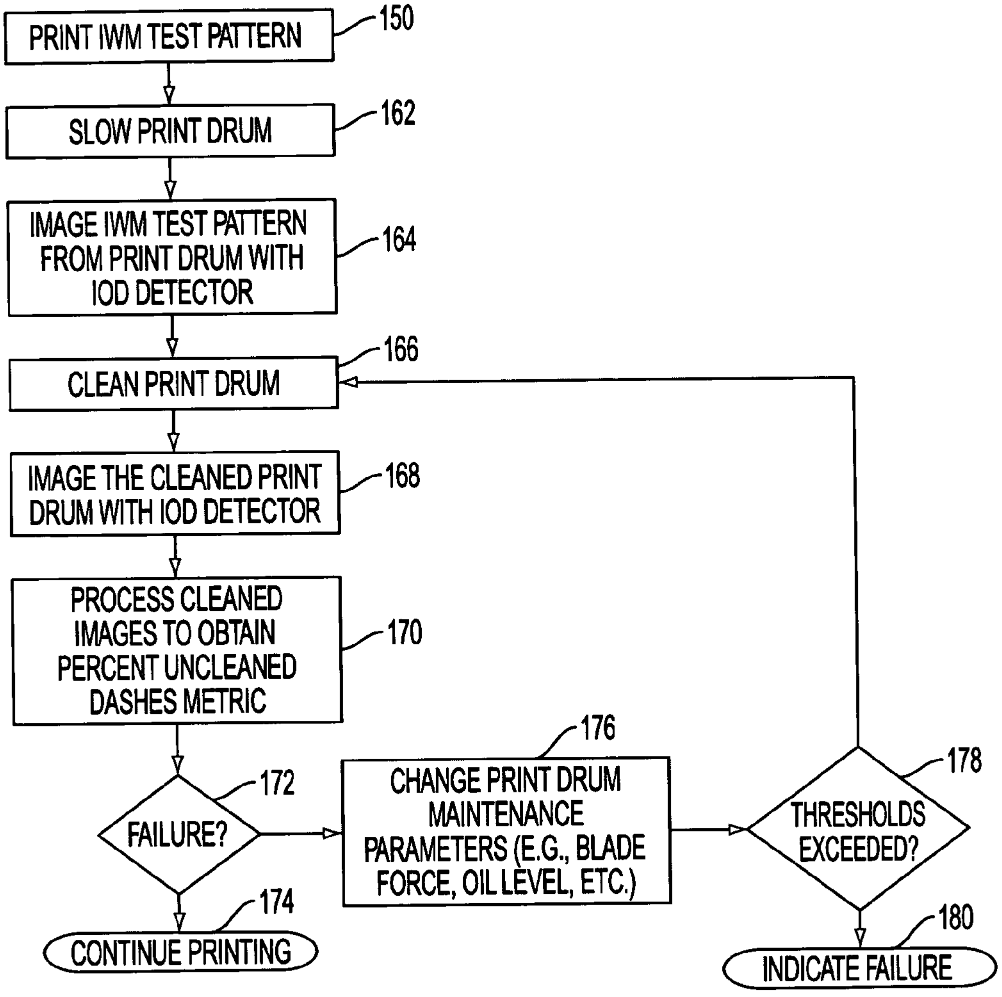
FIG. 7 is a flowchart for a method of monitoring a drum maintenance system.
Figure 8:
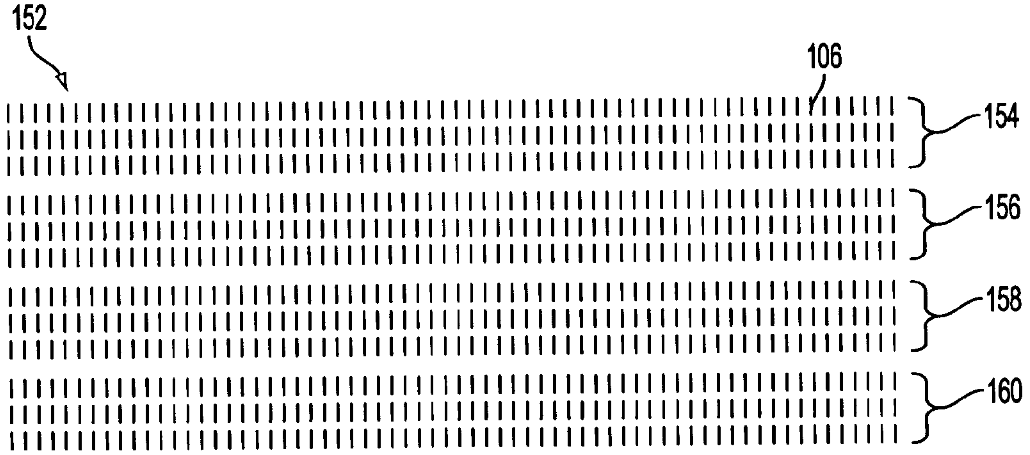
FIG. 8 is a sample printed test pattern.

With reference now to FIG. 7, a flowchart is provided for a method of monitoring the drum maintenance system 84 is provided. Step 150 is called at the end of a print job, or according to printer 10 system rules about when the functioning of the jets needs to be monitored. In this step, a test pattern 152, similar to that shown in FIG. 8, is printed at normal imaging speed. The test pattern 152 contains 8 strips 154-160, each strip including one or more rows of dashes. The test pattern 152 shown, is an exemplary pattern only, and may be configured to suit particular arrangements of print head assemblies. For example, each row of dashes 106 may index a specific row of nozzles on each print head assembly, or the number of rows may be increased to cover a larger area of the imaging surface 16 of the print drum 14 or to improve the precision of the monitoring system. Although the FIGURE shows a test pattern having four strips where each strip may represent a specific color, e.g., one strip for each of the CMYK colors of a color printer, the number of strips may also be suitably adjusted. Each strip shown consists of short dashes 106, approximately 20 pixels long in the process direction, although the method disclosed is not limited to dashes, or any particular arrangement in general.

With reference again to FIG. 7, in step 162, the print drum 14 rotational speed is slowed down for imaging the printed test pattern. In step 164 the printed test pattern image is sensed by the IOD detector 94 and stored in memory 64, for extraction of the above-described metrics by the image analysis algorithms. The pixel placement control subsystem and the head reliability control subsystem included in the controller 60 use these metrics to make decisions about operation of the drum maintenance system 84.

In step 166, the cleaning blade 90 is engaged with the print drum 14, and the printed test pattern 152 is cleaned from the drum. The cleaning can preferably occur with a single pass of the cleaning blade over the printed test pattern, but the cleaning can also be performed with multiple passes, as necessary. The drum rotational speed can also be changed to an optimal speed for effective cleaning.

In step 168, the print drum 14 is again slowed to the velocity at which the test pattern was imaged, and the now cleaned area is imaged and stored in memory 64. Preferably, the motion quality of the print drum 14 is such that the IOD detector 94 scan lines from each scan in the cross-process direction are aligned to a precision greater than the length of the dashes 106 in the test pattern 152.

In step 170, the stored un-cleaned and the stored cleaned image responses are processed to determine the percent of dashes that remain un-cleaned from the surface of the drum. This percentage is determined from the metrics previously described. If, e.g., the surface of the drum had the uniformity and high diffuse reflectance of paper, this processing would be straightforward. The cleaned image would consist of high reflectance everywhere except where any ink remained. The degree of failure could be determined by summing the sensor response over the regions of the image where the response was less than the full paper reflectance. However, the drum is highly textured as previously mentioned. Therefore, the following preferred technique is used in this step to determine the degree of failure, although alternative techniques are also included within the scope of the present disclosure.

First, the un-cleaned test pattern response is processed to identify coordinates of the test pattern dashes in the process and the cross process directions. These processing steps have been previously described in the present disclosure, as have the following processing steps.

Second, the spatial curvature is computed of the IOD detector response for the un-cleaned image at the position of each dash center for an average of the IOD detector scans that intersect the test pattern dash.

Third, the profile of the IOD detector response is computed for the cleaned image response over the same scan indices and the same position for the dash as in the stored un-cleaned image response.

If the IOD detector response minimum for the cleaned image is, e.g., within 2 pixels of that of the un-cleaned image, then the curvature at the IOD detector response minimum for the cleaned image response is computed.

The ratio of the curvature of the cleaned image response to that of the un-cleaned image response for each test pattern dash is computed. For each dash, if there is no minimum in the vicinity of the particular dash for the cleaned image, the ratio is set to a zero value.

It has been determined that for one particular drum surface texture, if the ratio of the curvatures is greater than a ratio threshold of 0.4, then a test pattern dash remains, while curvature ratios less than 0.4 can occur because of the texture of the drum. Therefore, the ratio of the number of metrics exceeding 0.4 to the total number of test pattern dashes gives the cleaning efficiency. This ratio threshold, however, may be selected according to the amount of texture present on particular print drums, or may be arrived at empirically by experimenting with different ratio thresholds.

In step 172, a decision is made as to whether cleaning-critical parameters of the drum maintenance system 84 need to be adjusted. If the cleaning efficiency is below a predetermined efficiency threshold, which is determined by the image quality requirements of the particular printer, then normal printing can continue in step 174. However, if the cleaning efficiency exceeds this efficiency threshold, additional steps are taken to deal with the cleaning efficiency failure. If the failure is only slight, then steps are taken, if possible, to increase the cleaning efficiency. For example, the force of the cleaning blade 90 against the print drum 14 may be increased, the level of oil on the drum, as applied by oiling roller 86, may be increased, and the number of passes the test pattern makes through the cleaning blade 90 may be increased. These parameters, and other appropriate parameters according to the capabilities of the particular printer, are adjusted in step 176.

However, the above-described parameters can usually only be adjusted so far without exceeding a limitation. For example, the number of passes required for cleaning cannot be increased indefinitely because the printer 10 is effectively down during this process and not printing. Increasing the oil level too high will affect the transfer efficiency of the image from the imaging surface 16 to the substrate in a detrimental manner. While these parameters remain within reasonable limits, they can be adjusted and the drum cleaning can be attempted again in step 166. But, when the adjustable parameters have reached their limits, i.e., they are no longer able to be adjusted, as determined at step 178, a failure is flagged in step 180. This flagging can be through a message to the user, by means of the user interface 66, to replace part of the drum maintenance system 84. Also, as the parameters are being adjusted to maintain cleaning efficiency, the existence of an imminent failure can be advantageously detected and reacted to. This can be done, e.g., by providing a warning message to the user that end of life for the drum maintenance system 84 is near, or sending an automated service call to a customer help center.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method for monitoring a transfer surface maintenance system in a printing system, the method comprising:

providing a textured intermediate transfer surface for transferring an image to a substrate;

printing a test pattern on the transfer surface;

imaging the printed test pattern with a transfer surface image detector to determine a printed pattern response;

cleaning the transfer surface by utilizing the transfer surface maintenance system to obtain a cleaned transfer surface;

imaging the cleaned transfer surface with the transfer surface image detector to determine a cleaned image response;

computing a cleaning failure rate by comparing the printed pattern response to the cleaned image response;

determining if a failure condition exists by comparing the computed cleaning failure rate to a predetermined limit;

performing a corrective process if the failure condition does exist as a result of the determining, the corrective process including:

changing parameters of the transfer surface maintenance system according to the computed cleaning failure rate;

comparing the changed parameters to predetermined thresholds;

repeating the cleaning, computing, and determining if the predetermined thresholds are not exceeded based on the comparing; and indicating a failure status if the predetermined thresholds are exceeded based on the comparing; and continuing normal printing if the failure condition does not exist as a result of the determining.

2. The method set forth in claim 1, wherein:

the intermediate transfer surface comprises a print drum; and the transfer surface image detector comprises an image-on-drum detector.

3. The method set forth in claim 1, wherein:

the intermediate transfer surface comprises a transfer belt; and the transfer surface image detector comprises an image-on-belt detector.

4. The method set forth in claim 1, wherein the printing the test pattern includes printing a test pattern at a full imaging speed, the method further including:

adjusting a velocity of the transfer surface to a preferred imaging velocity prior to the imaging the printed test pattern step;

adjusting the velocity of the transfer surface to a preferred cleaning velocity prior to the cleaning step; and adjusting the velocity of the transfer surface to the preferred imaging velocity prior to the imaging the printed test pattern step.

5. The method set forth in claim 1, wherein:

the imaging the printed test pattern with a transfer surface image detector includes imaging the printed test pattern with a full width array detector; and the imaging the cleaned transfer surface with the transfer surface image detector includes imaging the cleaned transfer surface with the full width array detector.

6. The method set forth in claim 1, wherein the printing the test pattern includes printing a plurality of strips, wherein each of the plurality of strips is printed with a color selected from one of a set of available colors on each of one or more print heads of the printing system, and each of the available colors is used in printing at least one of the strips.

7. The method set forth in claim 6, wherein the printing a plurality of strips includes printing a plurality of dashes for each of the plurality of strips.

8. The method set forth in claim 7, further including printing at least two strips for each selected color, the first of the two strips for each color printed using one of odd-indexed nozzles or even-indexed nozzles on each print head, and the remaining of the two strips for each color printed using the remaining nozzles on each print head.

9. The method set forth in claim 7, wherein the printing a plurality of dashes includes printing dashes comprising 20 pixels in a process direction.

10. The method set forth in claim 7, wherein the computing a cleaning failure rate includes:

identifying coordinates of each of the plurality of dashes in each of a cross-process direction and a process direction;

computing a printed pattern spatial curvature of the printed pattern response in the vicinity of each dash center coordinate;

computing a cleaned image profile of the cleaned image response in the vicinity of each dash center coordinate used for computing the printed pattern spatial curvature;

determining a plurality of minimums in the cleaned image profile;

computing a cleaned image curvature for each of the plurality of minimums which is within 2 pixels of the coordinates of one of the plurality of dashes;

computing a curvature ratio of the cleaned image curvature to the printed pattern curvature for each of the plurality of dashes, the ratio computed to be zero for each dash having no minimum within 2 pixels of the corresponding coordinates; and computing an efficiency ratio comprising the number of curvature ratios exceeding a predetermined ratio threshold divided by the total number of dashes.

11. The method set forth in claim 10, wherein the computing an efficiency ratio includes computing the number of curvature ratios exceeding a value of 0.4 divided by the total number of dashes.

12. The method set forth in claim 1, wherein the changing parameters of the transfer surface maintenance system is performed by at least one process selected from the group consisting of increasing a cleaning blade contact force;

altering an amount of release oil applied to the transfer surface; and increasing a number of passes of the intermediate transfer surface when cleaning the transfer surface.

13. The method set forth in claim 1, further including:

determining an imminent failure if predetermined warning thresholds are exceeded after the changing parameters of the transfer surface maintenance system; and performing an imminent-failure notifying action when an imminent failure is determined.

* * * * *